(12) United States Patent
Burgis

(10) Patent No.: US 10,893,061 B2
(45) Date of Patent: *Jan. 12, 2021

(54) AUTOMATED DETECTION OF PHISHING CAMPAIGNS VIA SOCIAL MEDIA

(71) Applicant: PAYPAL, INC., San Jose, CA (US)

(72) Inventor: Jakub Burgis, Luxembourg (LU)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/659,300

(22) Filed: Oct. 21, 2019

(65) Prior Publication Data
US 2020/0120113 A1 Apr. 16, 2020

Related U.S. Application Data

(63) Continuation of application No. 15/805,046, filed on Nov. 6, 2017, now Pat. No. 10,454,954.

(51) Int. Cl.
| | |
|---|---|
| *H04L 29/06* | (2006.01) |
| *G06F 21/55* | (2013.01) |
| *G06Q 50/00* | (2012.01) |
| *G06Q 50/26* | (2012.01) |
| *G06F 21/10* | (2013.01) |
| *G06Q 20/10* | (2012.01) |

(52) U.S. Cl.
CPC ........ *H04L 63/1416* (2013.01); *G06F 21/554* (2013.01); *H04L 63/1483* (2013.01); *G06F 21/10* (2013.01); *G06Q 20/10* (2013.01); *G06Q 50/01* (2013.01); *G06Q 50/265* (2013.01); *H04L 63/083* (2013.01); *H04L 63/102* (2013.01)

(58) Field of Classification Search
CPC . H04L 63/14; H04L 63/1441; H04L 63/1483; G06Q 50/01; G06Q 50/265
See application file for complete search history.

(56) References Cited

U.S. PATENT DOCUMENTS

| | | | |
|---|---|---|---|
| 2014/0172989 A1* | 6/2014 | Rubinstein | G06Q 50/01 709/206 |
| 2015/0229665 A1* | 8/2015 | Foster | H04L 63/1441 726/22 |

(Continued)

OTHER PUBLICATIONS

Zaman et al., Spam Detection in Social Media Employing Machine Learning Tool for Text Mining, 2017, 13th International Conference on Signal-Image Technology & Internet-Based Systems (SITIS) (Year: 2017).*

*Primary Examiner* — Khang Do
(74) *Attorney, Agent, or Firm* — Haynes and Boone LLP

(57) ABSTRACT

Methods and systems for automatically detecting and responding to phishing campaigns are described herein. Real-time feeds may be streamed from one or more social media servers. Each online post from the real-time feeds may be analyzed to determine whether the online post corresponds to a phishing campaign, by examining any web content that is linked from the online post. When it is determined that the online post corresponds to a phishing campaign, target user accounts of the phishing campaign may be identified by analyzing which user accounts have accessed the web content linked from the online post. Restrictions may be imposed to the target user accounts to prevent an account take-over and other losses to the user accounts.

20 Claims, 6 Drawing Sheets

(56) References Cited

U.S. PATENT DOCUMENTS

| | | | |
|---|---|---|---|
| 2015/0229666 A1* | 8/2015 | Foster | H04L 63/1441 |
| | | | 726/22 |
| 2016/0148332 A1* | 5/2016 | Stibel | G06Q 20/4014 |
| | | | 705/44 |
| 2016/0156641 A1* | 6/2016 | Kondapalli | H04L 63/1483 |
| | | | 726/22 |
| 2017/0041408 A1* | 2/2017 | Kramer | H04L 63/102 |
| 2017/0195363 A1* | 7/2017 | Dahan | H04L 63/104 |
| 2017/0237753 A1* | 8/2017 | Manning Dawson | |
| | | | H04L 63/1416 |
| | | | 726/23 |
| 2017/0358032 A1* | 12/2017 | Huffner | G06Q 50/01 |
| 2019/0036937 A1* | 1/2019 | Cullison | H04L 63/20 |
| 2019/0036960 A1* | 1/2019 | Cullison | H04L 63/1416 |
| 2019/0065748 A1* | 2/2019 | Foster | G06F 21/57 |
| 2019/0068632 A1* | 2/2019 | Foster | G06N 20/00 |
| 2019/0124109 A1* | 4/2019 | Foster | G06F 40/174 |
| 2020/0125729 A1* | 4/2020 | Priel | G06F 11/00 |
| 2020/0236109 A1* | 7/2020 | Steinberg | H04L 63/0245 |

\* cited by examiner

```
<!--
Script info: script: node, date: Oct 11, 2017 12:50:10 -07:00, country: US, language: en
hostname : rZJvnqaaQhLn/nmWT8cSUjOx898qoYZ0JcIVHgFd91mNgdvLMJn0sw
rlogid :
1ZUwXoUcChZUqYekC0LOqT%2FdLVVISyqmzfF8QyEdodUCcQq%2BM05peEDW7uBP11
qr7zOA0pxpGMo_15f0cfcbca3
-->

<title>Send Money, Pay Online or Set Up a Merchant Account - PayPal</title>
<!--
$$$$$$\            $$$$$$\         $$\
$$  __$$\          $$  __$$\        $$ |
$$ |  $$ |$$$$$$\  $$\ $$\ $$ |    $$ |$$$$$$\  $$ |
$$$$$$$  |\____$$\ $$ |$$$$$$$  |\____$$\ $$ |
$$  ____/ $$$$$$$ |$$ | $$  ____/ $$$$$$$ |$$ |
$$ |     $$  __$$ |$$ | $$ |     $$  __$$ |$$ |
$$ |     \$$$$$$$ |\$$$$$$$  |$$ |     \$$$$$$$ |$$ |
\__|      _____| _____|\__|      _____|\__|
                         $$\   $$ |
                         \$$$$$$  |
                          _____/

Now hiring @ https://www.paypal.com/jobs
-->
```

Figure 6

AUTOMATED DETECTION OF PHISHING CAMPAIGNS VIA SOCIAL MEDIA

CROSS-REFERENCE TO RELATED APPLICATIONS

This application is a continuation of U.S. patent application Ser. No. 15/805,046, filed Nov. 6, 2017, is herein incorporated by reference in its entirety.

BACKGROUND

The present specification generally relates to automated detection of online phishing campaigns, and more specifically to automatically detecting online phishing campaigns by monitoring and analyzing real-time social media feeds.

RELATED ART

Many instances of identity theft are caused by online phishing traps. Phishing is a technique where a malicious party poses to a user as a legitimate service provider with which the user has an account, usually by providing a presentation (e.g., a web interface, an e-mail, etc.) that looks like one generated by the legitimate service provider. The malicious party then requests the user to provide sensitive information (e.g., a user name, a password, etc.) via the presentation. With the information provided by the user, the malicious party may then take over the user account, and perform transactions such as withdrawing money, using the user account, causing monetary and other losses to the user.

Traditionally, phishing is usually facilitated via an e-mail or a link in an e-mail. However, there is an increase use of social media as a platform for launching phishing campaigns. Thus, there is a need for systems and methods that provide detection of phishing campaigns on social media, thereby preventing losses for the users.

BRIEF DESCRIPTION OF THE FIGURES

FIG. 6 illustrates exemplary scripts and/or comments.

Figure 1:
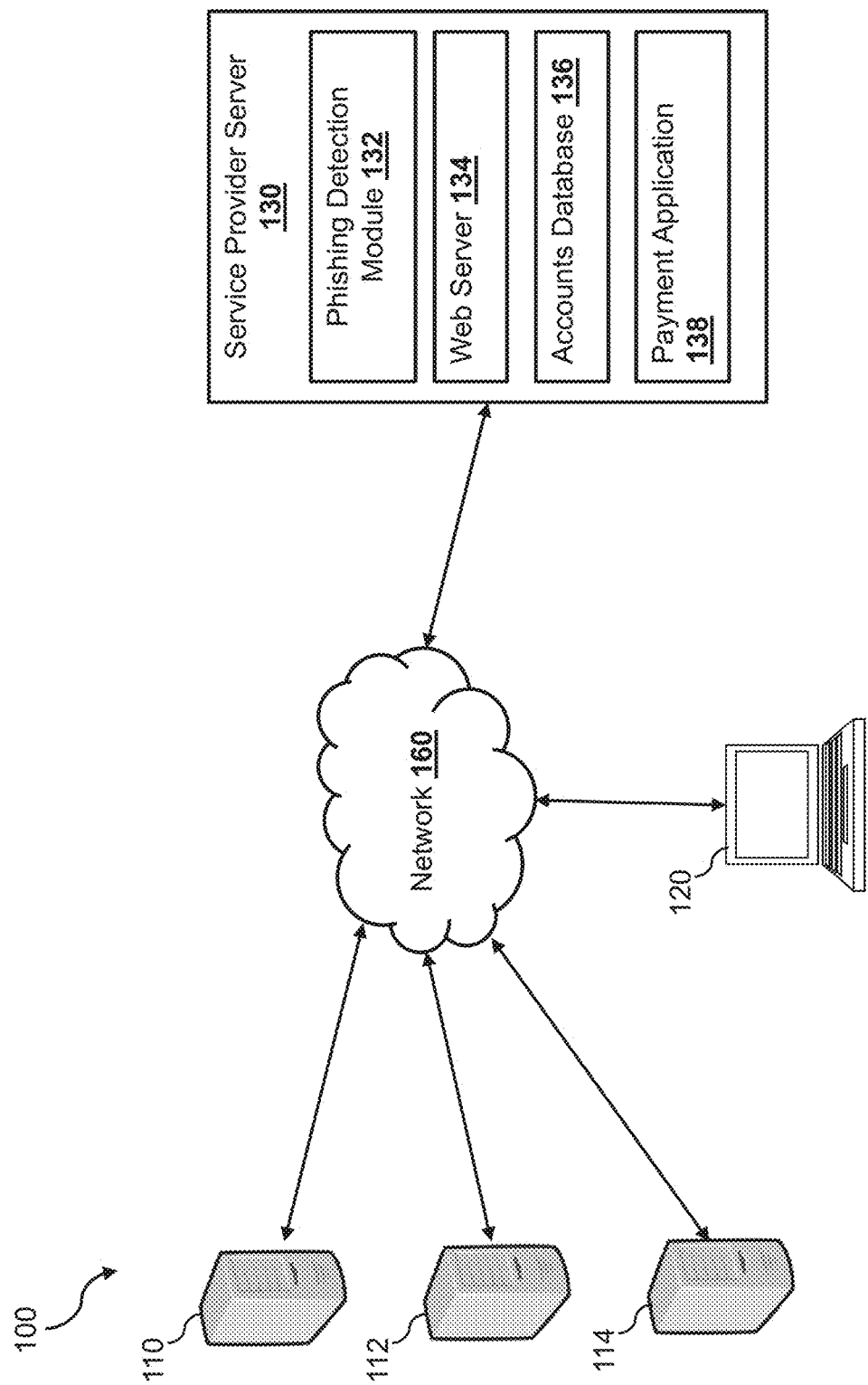
FIG. 1 is a block diagram illustrating a phishing detection system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for automatically detecting phishing campaigns in social media by monitoring and analyzing real-time social media feeds. Real-time feeds may be streamed from one or more social media servers, for example, by using a streaming application programming interface. Each online post from the real-time feeds may be analyzed to determine whether the post includes a link to web content. The web content may then be retrieved from the link.

One or more different analyses may be performed on the online post, the link included in the online post, and/or the retrieved web content from the link to determine if the online post corresponds to a phishing campaign. For example, the web content may be determined to include phishing content when the web content shares common elements as a webpage associated with an entity (e.g., a company, an organization, a person, etc.) while the link to the web content is associated with a domain that does not correspond to the entity. In other words, the web content tries to mislead viewers to believe that it is associated with the entity when it is not. In some embodiments, determining whether the web content shares common elements as the webpage associated with the entity includes performing a keyword analysis on the web content to determine whether the web content includes one or more keywords related to or associated with the entity and/or whether the web content includes a signature associated with the entity. The keyword analysis may also be performed to determine whether the web content requests viewers to submit sensitive information, such as a password or account information, via input fields on the displayed web content. In some embodiments, the keyword analysis may be performed on the displayed portion of the web content, the source code of the web content, or both. It is noted that the source code of the web content may include hidden text and/or comments embedded within the code.

In some embodiments, a visual analysis may also be performed on the displayed portion of the web content. For example, a webpage simulator may be used to simulate how the web content would look when rendered on a web browser, where the simulated webpage may then be compared against a webpage generated by the entity to determine if they both include similar properties (e.g., share a predetermined number of properties), such as a font type, a font size, a font colors, a graphical element appeared on the webpage, a layout of the webpage, a background of the webpage, and other web page properties.

In some embodiments, the link may also be analyzed to determine if there are indications that the corresponding web content includes phishing content. For example, the link may be analyzed to determine if it includes characters that are similar to identified keywords associated with the entity (e.g., the name of the entity, a product name associated with the entity, etc.). External sources may also be used to determine or retrieve a reputation of a domain indicated by the link.

According to various embodiments of the disclosure, one or more of these analyses described herein may be used to determine whether the online post corresponds to a phishing campaign. When it is determined that the online post corresponds to a phishing campaign, one or more actions may be performed to prevent losses arising from the phishing campaign. For example, a request to take down the web content from the web may be automatically generated. In some embodiments, one or more user accounts with the entity that is targeted by the phishing campaign may be identified. An elevated security protocol may be implemented for the identified one or more user accounts to prevent losses from those user accounts.

FIG. 1 illustrates a phishing detection system 100 according to one embodiment of the disclosure. The phishing detecting system includes a service provider server 130 that is communicatively coupled with various social media servers (such as a social media server 110 and a social media server 112) and web servers (such as a web server 114) via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

Each of the social media servers 110 and 112 is configured to maintain a social media platform. Example social media platforms include Twitter®, Facebook®, Instagram®, and Snapchat®. After a user has registered an account with a social media platform, the user may begin to submit online posts and receive feeds of online posts generated by other users (e.g., posts generated by friends of the user) through the social media platform. As such, each social media server is configured to maintain and manage feeds of online posts and facilitate generation and presentation of the online posts. It is noted that while only two social media servers are shown in FIG. 1, the service provider server 130 may be connected with as many (or as few) social media servers via the network 160 as necessary or desired to perform the functions described herein.

The web server 114 is configured to process hypertext transfer protocol (HTTP) requests. For example, when a user types in a web address (e.g., a uniform resource locator (URL) address) on a web browser of a user device (e.g., a user device 120), the web browser may generate a HTTP request and may transmit the request to a web server corresponding to the web address. When the web server 114 receives an HTTP request, the web server 114 may serve web content in response to the request. For example, the webserver 114 may store different pre-generated web content associated with different web address, and as such, the web server 114 may retrieve the corresponding web content based on the web address included in the HTTP request. The web content is then transmitted back to the web browser for presentation. For example, the web browser may render a webpage to be displayed on a user device, such as the user device 120, based on the received web content. Although only one web server 114 is shown in FIG. 1, it is noted that the service provider server 130 may be connected to as many (or as few) web servers as necessary or desired via the network 160 to perform the functions described herein.

The service provider server 130, according to some embodiments, may be maintained by an online service provider, such as PayPal, Inc. of San Jose, Calif., which may provide services related to detection of online phishing campaigns. The service provider server 130 may also be configured to process online financial and information transactions on behalf of users. In some embodiments, the service provider server 130 may also be configured to provide access to goods and services (collectively referred to as "items") of a merchant or service provider that are for purchase and may provide a payment service processing for the purchased items.

According to various embodiments of the disclosure, the service provider server 130 may include a phishing detection module 132 configured to perform the automated phishing detection functionalities as described herein. The service provider server 130 may also include a web server 134 that is configured to serve web content to users in response to HTTP requests. As such, the web server 134 may include pre-generated web content ready to be served to users. For example, the web server 134 may store a log-in page, and is configured to serve the log-in page to users for logging into user accounts of the users to access various services provided by the service provider server 130. The web server 134 may also include other webpages associated with the different services offered by the service provider server 130. As a result, a user may access a user account associated with the user and access various services offered by the service provider server 130, by generating HTTP requests directed at the service provider server 130.

The service provider server 130 may also include an accounts database 136 that stores information related to user accounts that were registered with an entity through the service provider server 130. The information of a user account stored in the accounts database 136 may include a user name, a password (or other types of authentication credentials such as fingerprint information), contact information, other personal information of the user, transaction history related to the user account, available funds of the user account, and other user account related information. In some embodiments, the payment application 138 may process transactions, such as payment transactions, with a user account based on the account information associated with the user account stored in the accounts database 136. The service provider server 130 may include other applications and may also be in communication with one or more external databases (not shown), that may provide additional information to be used by the service provider server 130. In some embodiments, the one or more external databases may be databases maintained by third parties, and may include third party account information of users who have user accounts with the service provider server 130.

Figure 2:
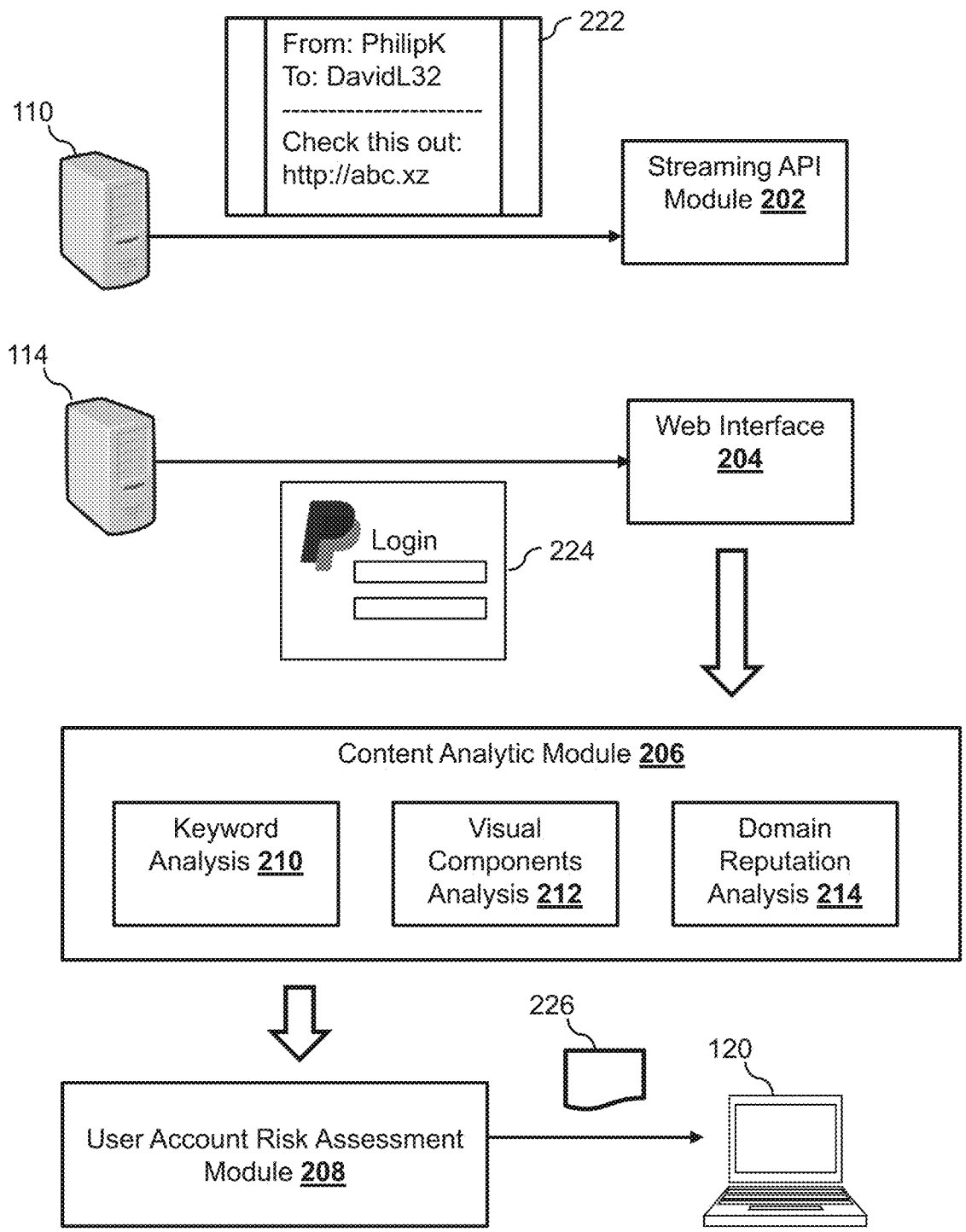
FIG. 2 illustrates analyzing an online post to detect a phishing campaign according to an embodiment of the present disclosure.

FIG. 2 illustrates the phishing detection module 132 of the service provider server 130 performing detection of phishing campaigns on social media according to various embodiments of the disclosure. In some embodiments, the phishing detection module 132 may include various sub-modules that perform different tasks for the detection of phishing campaigns. For example, the phishing detection module 132 may include a streaming API module 202, a web interface 204, a content analytic module 206, and a user account risk assessment module 208.

The streaming API module 202 may include application programming interfaces (API) corresponding to one or more social media servers (such as social media servers 110 and 112) for streaming real-time social media feeds from the social media servers 110 and 112. Each real-time social media feed may include online posts generated and posted through user accounts with the corresponding social media platform. For example, the phishing detection module 132 may use the streaming API module 202 to stream a real-time social media feed from the social media server 110. The real-time social media feed includes online posts generated and posted through user accounts to the social media server 110 in real time. Real time is defined herein as substantially close to the time that an event occurs (e.g., within the last five seconds, within the last 2 seconds, etc.). As such, the streaming API module 202 enables the phishing detection module 132 to continuously receive and detect online posts almost immediately as new online posts are posted on the social media server 110. The real-time social media feed may include one or more online posts, such as an online post 222. As shown, the online post 222 may include information related to a user account with the social media server 110 that generated the online post 222 (shown in this example as an account handle 'PhilipK'), information related to a target recipient account with the social media server 110 (shown in this example as another account handle 'DavidL32'), and main content of the online post 222.

In some embodiments, the phishing detection module 132 may analyze the online post 222 to determine if the online post 222 includes a link. In this regard, the phishing detecting module 132 may parse a source code of the online post 222 to determine whether an active link is included in the online post 222. For example, if the online post 222 is encoded using an HTML format, the phishing detection module 132 may determine whether the source code includes a hyperlink (such as a '<a>' tag). If the phishing detection module 132 determines that the source code includes a hyperlink, the phishing detection module 132 may retrieve a web address (e.g., a URL address) from the hyperlink. The phishing detection module 132 may also parse the displayable content of the online post 222 to determine whether it includes any text that resembles a web address. For example, the phishing detection module 132 may determine whether any phrase/word begins with "http," "https," or "www." If the phishing detection module 132 determines that the displayable content of the online post 222 includes a web address, the phishing detection module 132 may extract the web address from the online post 222. In this example, the phishing detecting module 132 determines that the online post 222 includes a web address "http://abc.xz."

As discussed above, the phishing detection module 132 may first analyze the web address to determine if it corresponds to a website of a legitimate entity, for example, a company that the phishing detection module 132 is configured to protect from phishing campaigns. For example, the phishing detection module 132 may be configured to protect a company, such as PayPal, from phishing campaigns, and may determine whether the web address from the online post 222 refers to a website associated with PayPal. In some embodiments, the phishing detection module 132 may determine a domain name from the web address and determine whether the domain corresponds to PayPal—e.g., paypal.com. In this example, the web address appeared in the online post 222 refers to a domain of "abc.xz" which is not a domain associated with PayPal. The phishing detection module 132 may then conclude that the web address does not refer to a legitimate webpage of PayPal as the web address does not correspond to a domain associated with the entity PayPal.

In some embodiments, the phishing detection module 132 may further analyze the web address and/or link to determine whether the online post 222 corresponds to a phishing campaign. For example, when the online post 222 includes a hyperlink, the phishing detection module 132 may determine whether the displayable text for the hyperlink corresponds to the web address of the hyperlink. If the displayable text is different from the web address (e.g., when the online post 222 displays "www.paypal.com" but the web address of the hyperlink refers to "abc.xz"), the phishing detection module 132 may conclude that the online post corresponds to a phishing campaign.

In some embodiments, the phishing detection module 132 may also analyze the web address appearing on the online post 222 to determine if the web address was created to imitate a legitimate web address. In this regard, the phishing detection module 132 may analyze different portions of the web address appearing in the online post 222 and compare those portions against different portions of a legitimate domain name of the entity, name of the entity, and/or product/service names offered the entity. For example, if the online post 222 includes a web address "pa.ypal.com," the phishing detection module 132 may compare different portions of the web address, such as "pa" and "ypal" against the names associated with the entity's name, such as "PayPal." In this example, the phishing detection module 132 may determine that the portions "pa" and "ypal" correspond to portions of the company's name "PayPal," and as such, may conclude that the online post 222 corresponds to a phishing campaign. In some embodiments, the phishing detection module 132 may conclude that the online post 222 corresponds to a phishing campaign when the different portions of the web address correspond to a percentage of the entity's name, a product name of the entity, or the entity's domain name that exceeds a predetermined threshold (e.g., 70%, 80%, etc.).

Upon determining that the web address does not correspond to a web address of the entity, the phishing detection module 132 may then use the web interface 204 to retrieve web content based on the web address in order to analyze the web content. For example, the web interface 204 may submit an HTTP request using the retrieved web address. The HTTP request may then be routed to a web server (e.g., the web server 114) corresponding to the web address. In response to the HTTP request, the web server 114 may transmit web content, such as web content 224, to the service provider server 130.

According to various embodiments of the disclosure, the phishing detection module 132 may use the content analytic module 206 to analyze the web content 224 to determine whether the web content 224 includes phishing content (e.g., corresponding to an online phishing campaign). In some embodiments, the content analytic module 206 may perform one or more analyses on the web content 224 to determine if the web content 224 includes phishing content. For example, the content analytic module 206 may use a keyword analysis sub-module 210 to perform a keyword analysis on the web content 224.

Figure 3:
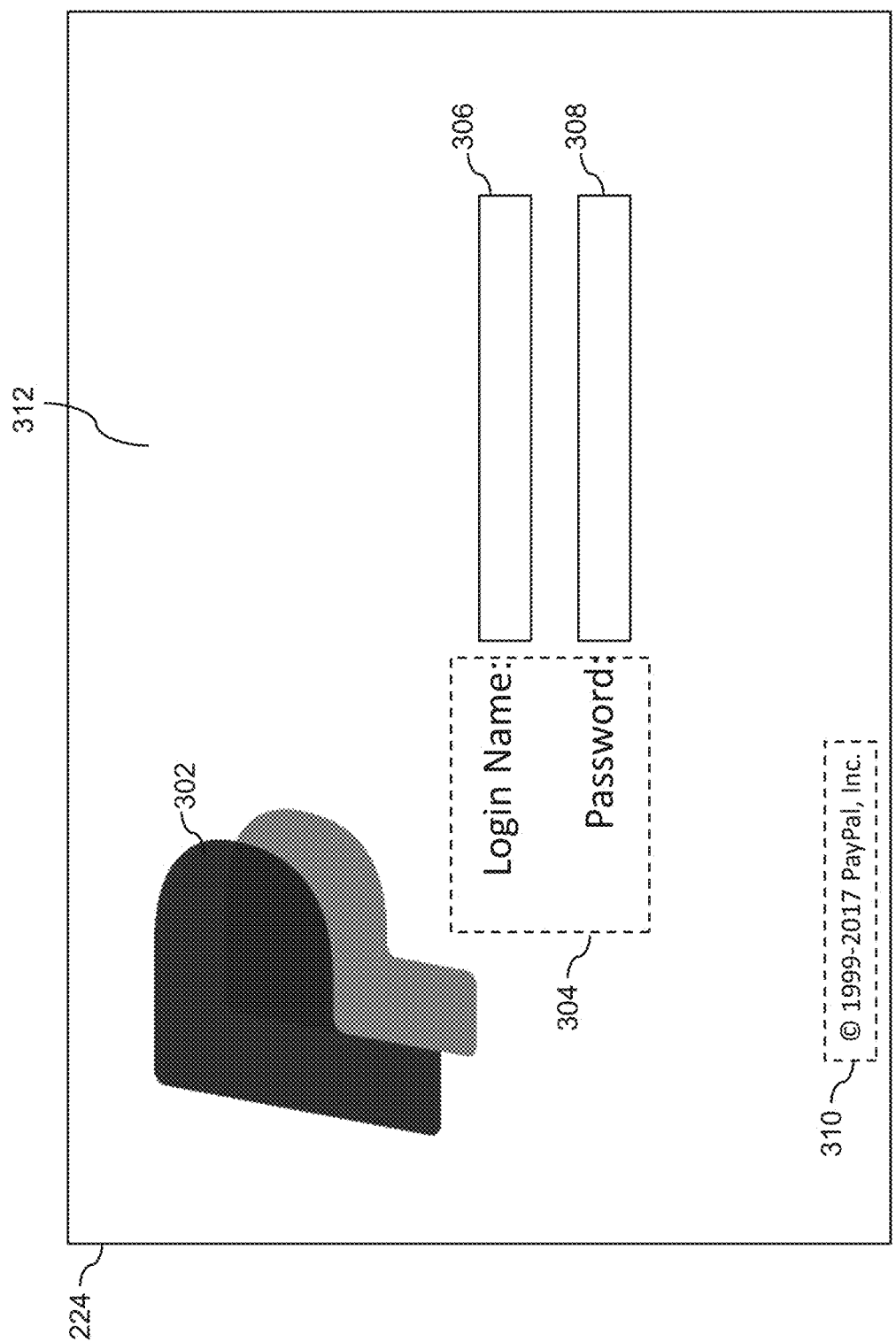
FIG. 3 illustrates an example online post according to an embodiment of the present disclosure.

The keyword analysis sub-module 210 may extract displayable text of the web content 224 and may determine if the displayable text includes words or phrases related to an entity (e.g., a name of the entity, a name of a product or a service offered by the entity, etc.) that the phishing detection module 132 intends to protect. For example, when the phishing detection module 132 intends to protect a company called "PayPal" from phishing campaigns, the keyword analysis sub-module may determine whether the displayable text of the web content 224 includes words and/or phrases related to PayPal. Such words and phrases may include the name of the company, such as "PayPal," names of products or services offered by the company, and phrases that usually appear on the company's website, such as a copyright statement, a legal disclaimer, a slogan associated with the company, and other standard statements of the company. FIG. 3 illustrates a rendered webpage based on the web content 224. As shown, the rendered webpage of the web content 224 includes a copyright statement 310 referring to the company name "PayPal," which may indicate that the web content 224 includes phishing content, as it tries to put itself out as the website of the company "PayPal" while the web address is not associated with PayPal. As such, the phishing detection module 132 may determine that the online post corresponds to a phishing campaign.

In addition, the keyword analysis sub-module 210 may also analyze the displayable content to determine whether it includes elements for trying to collect sensitive information from a user. Words or phrases that ask users to input certain information, such as login names, passwords, or other sensitive information may be used in this analysis. The keyword analysis sub-module 210 may also examine the source codes of the web content to determine if it includes any fields for user to input data (for example, having the <form> tag or JavaScript® for collecting user's data) and their corresponding text on display. For example, as shown in the web content 224, the keyword analysis sub-module 210 may determine that the web content 224 includes text input fields 306 and 308, and the displayed text corresponding to the text input fields 306 and 308 are "Login Name" and "Password," which indicates that the web content 224 intends to collect login data for user accounts associated with the entity, such as PayPal. As such, the phishing detection module 132 may determine that the online post 222 corresponds to a phishing campaign. In some embodiments, the phishing detection module 132 may conclude that the online post 222 corresponds to a phishing campaign when a combination of the words "login" and the company's name such as "PayPal" appear on the web content 224.

Furthermore, the keyword analysis sub-module 210 may also analyze the source code of the web content 224 to determine if the source code and the hidden text (not displayed on the rendered webpage such as comments to the source code) of the web content 224 includes any signature of the company. Typically, there are signatures (e.g., common characters or phrases) that appear on almost all web content generated by a company or entity. The signatures may include a portion of the source code, a portion of the comments to the source code, or line spacing that are common across all web content developed by the company due to, for example, a standard coding style developed within the company.

For example, a company such as PayPal may include the scripts and/or comments as illustrated in FIG. 6 in all of the web content associated with PayPal.

Thus, the keyword analysis sub-module 210 may compare portions of the source codes and hidden text of the web content 224 with predetermined signatures associated with a company (such as the ones described above) to determine whether the web content 224 includes signatures associated with the company. If it is determined that the web content 224 includes one or more signatures associated with the company, the phishing detection module 132 may conclude that the online post corresponds to a phishing campaign.

Instead of or in addition to the keyword analysis, the content analytic module 206 may use a visual components analysis sub-module 212 to analyze the graphical elements of the web content 224. In some embodiments, the visual components analysis sub-module 212 may examine one or more visual components of the web content 224 to determine if the web content 224 attempts to put itself out as a website associate with the company. For example, the visual components analysis sub-module 212 may examine one or more of: a layout of a rendered web content, a text font used for the text in the web content, a text color used for the text in the web content, a background color and/or pattern of the web content, or various images displayed on the web content. Referring back to FIG. 3, the visual components analysis sub-module 212 according to various embodiments of the disclosure may analyze the layout of the web content 224 by comparing an amount and location of the empty space in the web content 224, the locations of the text input fields 306 and 308, and/or the location and size of a graphical element, such as a graphical element 302 against a webpage associated with the company (e.g., a log-in page of the company) to determine whether the layout of the web content 224 correspond to the layout of the webpage associated with the company.

For example, the phishing detection module 132 may conclude that the online post corresponds to a phishing campaign when the visual components analysis sub-module 212 determines that the layout of the web content 224 and the layout of the webpage associated with the company are similar by a certain predetermined threshold (e.g., more than 70%, more than 80%, etc.) (in other words, the layout of the web content 224 deviates from the layout of the webpage associated with the company by less than a predetermined threshold, such as less than 30%, less than 20%, etc.). To compare the layouts, the visual components analysis sub-module 212 according to various embodiments of the disclosure may generate a screen shot of a rendered webpage corresponding to the web content 224, and compare the screen shot of the web content to a screen shot of a webpage associated with the company (e.g., a log-in page of the company). In some embodiments, the visual components analysis sub-module 212 may use one or more image recognition algorithms (e.g., an edge detection algorithm) to compare the two screen shots. By applying the image recognition algorithms, the visual components analysis sub-module 212 may determine an amount of deviation between the two screen shots, which can then be compared with a predetermined threshold.

The phishing detection module 132 may also conclude that the online post corresponds to a phishing campaign when the visual components analysis sub-module 212 determines that the background color and the text properties, such as the text font type, and the text font colors used in the text of the web content 224 are substantially the same as the text font type and the text font colors used in the web page of the company. In this regard, the visual components analysis sub-module 212 may determine the text font type and the text font colors by examining the text property tags in the source code of the web content 224. The background color and text font colors may be indicated in the web content 224 as a hex code or an RGB code. For example, the visual components analysis sub-module 212 may compare the text font types and text colors of the texts 304 and 310 against text font types and text colors of corresponding text in the webpage associated with the company, and may compare the color of the background 312 of the web content 224 against the background color of the webpage associated with the company (e.g., the login page of the company). The phishing detection module 132 may then conclude that the online post corresponds to a phishing campaign when the background colors, the text font types, and the text colors do not deviate for the corresponding background colors, the text font types, and the text colors of the company's webpage by a certain predetermined percentage (e.g., 20%, 30%, etc.).

In some embodiments, the visual components analysis sub-module 212 may also analyze one or more images (using an image recognition module) included in the web content 224 to determine if any of the images correspond to images of the company (e.g., a logo of the company, a user interface button used in the web page of the company, a licensed image that is used in a webpage of the company, etc.). The images may be a logo, a background image, a button for a user interface element on the web content 224, or other types of images that are presented in the web content 224. In one embodiment, the images of the company used in this analysis are unique to the company. In this example, the web content 224 includes an image 302. The visual components analysis sub-module 212 may use one or more image recognition algorithms to determine that the image 302 is substantially similar to a logo of the entity (e.g., 90% similar). In some of these embodiments, the visual components analysis sub-module 212 may use one or more image recognition algorithms (e.g., edge detection techniques) to compare elements in the images included in the web content 224 and images related to or associated with the company. The images related to the company may be stored within the service provider server 130 or accessible by the service provider server 130. Thus, the phishing detection module 132 may conclude that the online post 222 corresponds to a phishing campaign when the visual components analysis sub-module 212 determines that an image included in the web content 224 is substantially the same (e.g., at least 80% similar, at least 90% similar, etc.) as an image related to the company. In this example, using the image recognition algorithm, the visual components analysis sub-module 212 may determine that the image 302 included in the web content 224 is substantially similar to a logo of the company PayPal.

Instead of or in addition to analyzing the images themselves, the visual components analysis sub-module 212 may examine source addresses of the images. Often times, the creator of a phishing website may simply copy the source code of an existing webpage of the company for the phishing website. As such, the copied webpage may still point the sources of the images to the original source locations, which are usually locations that are part of the domain of the company. An example of such an image source may be: https://www.paypalobjects.com/en_US/i/scr/sm_333_oo.gif. As such, the visual components analysis sub-module 212 may examine the source addresses of the images to determine whether they refer to a domain of the company. The phishing detection module 132 may conclude that the online post 222 corresponds to a phishing campaign when an image in the web content 224 has a source location that is part of the domain of the company.

Furthermore, the content analytic module 206 may also use a domain reputation analysis sub-module 214 to determine a reputation of a domain corresponding to the web content 224. The domain reputation analysis sub-module 214 may extract the domain corresponding to the web content 224 from the web address in the online post 222. The domain reputation analysis sub-module 214 may then submit the extracted domain to a third-party server, which will provide a reputation rating of the domain. The phishing detection module 132 may then conclude that the online post 222 corresponds to a phishing campaign if the determined reputation rating of the domain corresponding to the web content 224 is below a predetermined threshold (e.g., 50% rating, 40% rating, etc.).

When it is determined that the online post 222 does not correspond to a phishing campaign, the phishing detection module 132 may disregard the online post 222 and analyze the next online post in the real-time social media feed received from the social media server 110. However, when it is determined that the online post 222 corresponds to a phishing campaign, the phishing detection module 132 may perform one or more actions to prevent losses due to the phishing campaign. For example, the phishing detection module 132 of some embodiments may automatically generate a take-down request for the web address that appeared in the online post 222, and may transmit the take-down request to the domain associated with the web address. In some embodiments, the phishing detection module 132 may also use the user account risk assessment module 208 to identify user accounts with the entity that are targeted by the phishing campaign, such that those user accounts may be properly protected from being taken over by the malicious users associated with the phishing campaign and/or from unauthorized transactions performed by the malicious users associated with the phishing campaign.

Accordingly to various embodiments of the disclosure, the user account risk assessment module 208 may use one or more of the following techniques to identify user accounts of the entity that are targeted by the phishing campaign. In some embodiments, the user account risk assessment module 208 may identify a user account of the entity being targeted by the phishing campaign based on information related to an intended recipient of the online post 222. It is noted that an online post may indicate an intended recipient user account of the social media server for the online post. For example, as shown in FIG. 2, the online post 222 indicates that it is intended for a user account of the social media server 110 having a user name of 'DavidL32.' As such, the user account risk assessment module 208 of some embodiments may identify a user account of the entity based on information related to the intended recipient user account of the social media server 110. It is noted that a user may likely use identical (or very similar) user names across multiple platforms and entities. Thus, the user account risk assessment module 208 may search through the accounts database 136 to identify a user account with the entity having a user name identical or substantially similar to the user name 'DavidL32.' In some embodiments, the user account risk assessment module 208 may also scrape online posts generated by the user account 'DavidL32' on the social media server to extract additional information, such as residence location of the user, contact information, purchase history of the user, locations that the user has recently visited, etc., to assist the user account risk assessment module 208 to identify a user account of the entity that corresponds to the user account 'DavidL32' of the social media server 110.

As discussed above, the web content 224 may include an image having a source pointing to a domain of the entity. For example, the image 302 of the online post 224 may have a source location associated with a domain of an entity (e.g., https://www.paypalobjects.com/en_US/i/scr/sm_333_oo.gif). In such a scenario, whenever a user accesses the web content 224 via a web browser, the web browser would send a request to the web server of the entity, such as the web server 134, to retrieve the image in order to render the web content 224 on the web browser. As such, the phishing detection module 132 may use the web browser 134 to track a user device being used to view the web content 224 (for example, by placing a cookie, such as cookie 226, on the user device in response to the request for the image 302). During the next time the user uses the user device to log onto a legitimate website of the entity (e.g., a legitimate PayPal website), the web server 134 may determine whether the user has accessed a phishing website (accessed the web content 224) previously by determining whether such a cookie is stored on the user device. In some embodiments, the phishing detection module 132 may also determine if an existing cookie has been placed previously by the web server 134 on the user device. For example, the cookie may have been placed previously by the web server 134 when the user visited the legitimate website of the entity prior to the user accessing the web content 224. The existing cookie may include information related to a user name of the user account that has been accessed by the user device (for example, when the user requests the web browser to remember the user name for the entity). Thus, the phishing detection module 132 may then identify the user account that was accessed by the user using the user device as a user account targeted by the phishing campaign.

In some embodiments, once one or more user accounts of the entity are identified as being targeted by the phishing campaign, the user account risk assessment module 208 may perform further analysis on subsequent user activities of the user accounts for a predetermined period of time (e.g., a week, a month) to determine whether the accounts have been taken over. For example, the user account risk assessment module 208 may use machine learning and pattern matching techniques to determine whether the subsequent user activities of the identified user accounts match patterns of accounts that have been taken over by malicious users in the past. The user account risk assessment module 208 may conclude that an identified user account has been taken over by a malicious user when the subsequent activities of the identified user account subsequently match (e.g., 80%, 90%, 95%) the patterns. In some embodiments, the user account risk assessment module 208 may also generate a user activity trend for an identified user account based on past activities of the user account, and determine whether (and how much) the subsequent user activities deviate from the generated trend. The user account risk assessment module 208 may then determine that the identified user account has been taken over by a malicious user if the subsequent activities deviate from the generated trend by a predetermined percentage (e.g., 20%, 30%, etc.).

For the user accounts of the entity that have been identified as being targeted by the phishing campaign (or determined to have been taken over by a malicious user), the phishing detection module 132 may elevate a security risk level for those user accounts. For example, the phishing detection module 132 may change the security risk level of those accounts from a normal risk level to an elevated risk level, or even to an alarmed level. The risk levels may indicate different security protocols when the user accounts are being accessed. For example, under the normal risk level, the user account may be accessed via a normal authentication process of user name and password. However, under the elevated risk level, in addition to the user name and password, other security data (e.g., security questions and answers that were predetermined during a registration process, additional identification data such as home address, social security number, etc.) may be required. Furthermore, under the elevated risk level, certain transaction restrictions may be placed on the user account, such as a maximum amount for each transaction, a location restriction (can only be used when the user is located in the home city), etc. Under the alarmed level, the user account may be locked for a predetermined period of time (e.g., a month, several months, etc.).

The user account risk assessment module 208 may also transmit an electronic notification to the users associated with the identified user accounts based on the contact information associated with the identified user accounts stored in the accounts database 136, informing the users of a potential risk of having their sensitive information divulged. In some embodiments, the user account risk assessment module 208 may transmit the warning notification at the time it determines that the user accessed the web content 224, for example, when the web server 134 receives a request to download the image 302 to the user device based on the web address in the online post 222.

Thus, based on the monitoring and analyzing of various social media feeds according to various embodiments disclosed herein, phishing campaigns may be detected and losses from user accounts with the entity may be prevented.

Figure 4:
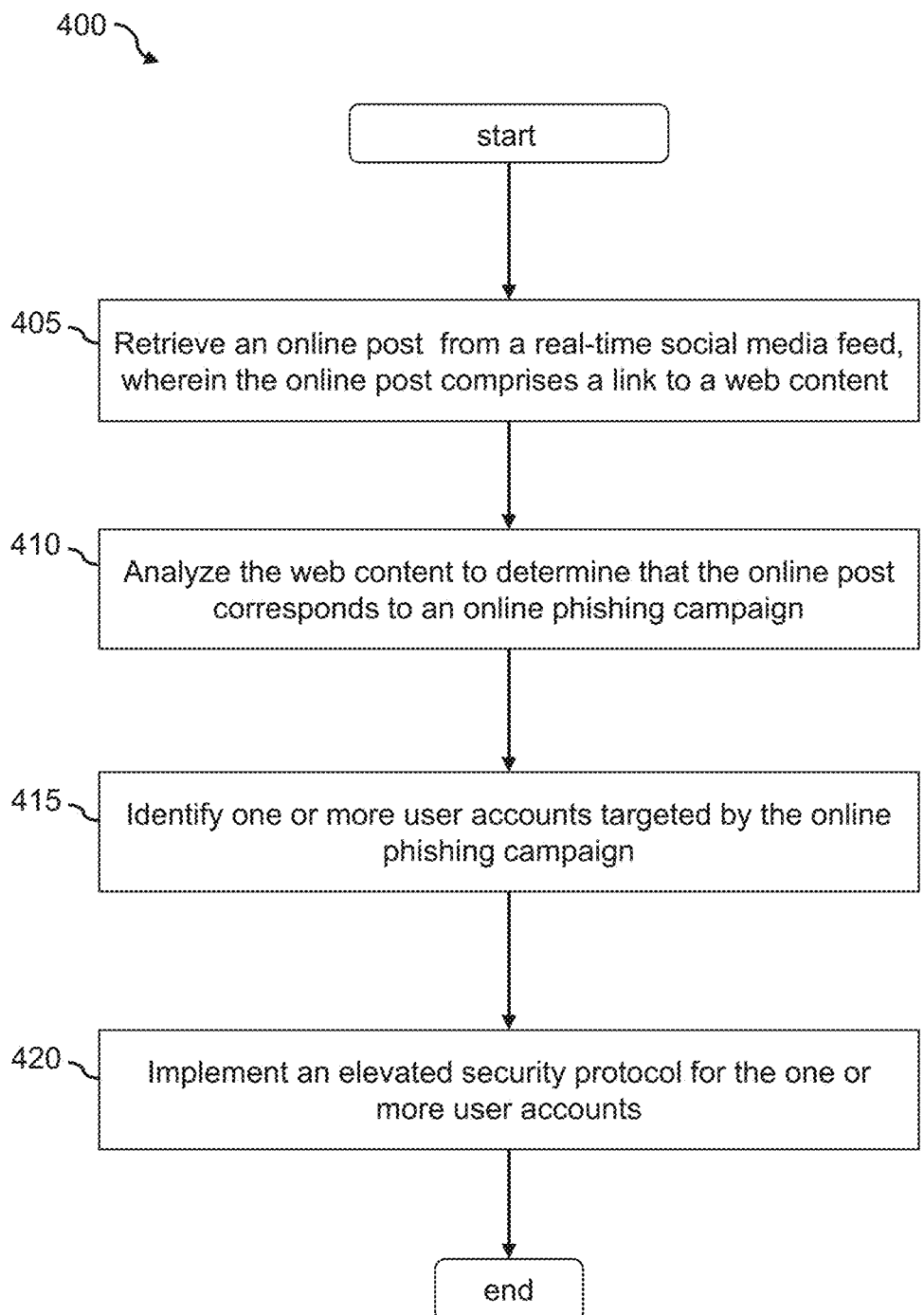
FIG. 4 is a flowchart showing a process of analyzing an online post to detect a phishing campaign according to an embodiment of the present disclosure.

FIG. 4 illustrates a process 400 for detecting online phishing campaigns according to an embodiment of the disclosure. In some embodiments, the process 400 may be performed by the phishing detection module 132 of the service provider server 130. As discussed above, real-time social media feeds may be streamed from one or more social media servers. For example, the phishing detection module 132 may utilize a streaming API, such as Spark Streaming developed by Apache®, to stream real time feeds from social media servers 110 and 112. Each real-time social media feeds may include many online posts that are generated and posted by various users to the corresponding social media server. As such, in step 405, an online post is retrieved from a real-time social media feed. As discussed above, the online post may be determined to include a link to web content. For example, the phishing detection module 132 may examine the online post to search for a hyperlink based on a hyperlink HTML tag, and/or search for strings of characters that begin with "http," "https," or "www."

Once it is determined that the online post includes a link, the phishing detection module 132 may extract a web address from the link and use the web server 134 to retrieve the web content from a web server corresponding to the web address (e.g., the web server 114). In step 410, the web content is analyzed to determine whether the online post corresponds to a phishing campaign. As discussed above, the phishing detection module 132 may perform one or more analyses to make such a determination. For example, the phishing detection module 132 may perform a keyword analysis to determine if the web content includes text that is associated with an entity, such as a name of the entity, product or service names of the entity, and phrases that are commonly used on webpages associated with the entity (e.g., a copyright statement, a legal disclaimer statement, etc.). The phishing detection module 132 may also analyze the source code of the web content to determine whether the source code includes signature codes or signature hidden texts that are associated with the entity.

In some embodiments, the phishing detection module 132 may perform a visual components analysis on the web content to determine whether visual properties of the web content, such as a layout, a font type, a font size, a font color, a background color, and/or an image corresponds to that of the entity. In some embodiments, the phishing detection module 132 may also communicate with a third party server to determine a reputation of a domain of the web address included in the online post.

Once it is determined that the online post corresponds to a phishing campaign, at step 415, one or more user accounts with the entity may be identified as being targeted by the online phishing campaign. For example, the online post may indicate an intended recipient user account of the social media server. As such, the phishing detection module 132 may identify a user account with the entity based on information (e.g., user name, home address, purchase history, etc.) of the intended recipient user account retrieved from the social media server. In some embodiments, when it is determined that the web content includes an image that has a source address associated with the entity, the phishing detection module 132 may monitor user devices that generates a request to retrieve the image via the web address included in the online post, and identify user accounts based on an identity of the user devises.

In some embodiments, the phishing detection module may perform additional analyses to the user activities of those identified user accounts to determine whether the user accounts have been taken over by a malicious user. At step 420, an elevated security protocol may be implemented for the identified user accounts. For example, the security risk levels of all of the identified user accounts may be elevated from a normal risk level to an elevated risk level. In some embodiments, based on the additional analyses performed on the user activities of the identified user accounts, those user accounts that are determined to have been taken over by a malicious user may be raised to an even higher risk level, such as an alarmed risk level. Different security protocols may be applied to user accounts at different risk levels.

Figure 5:
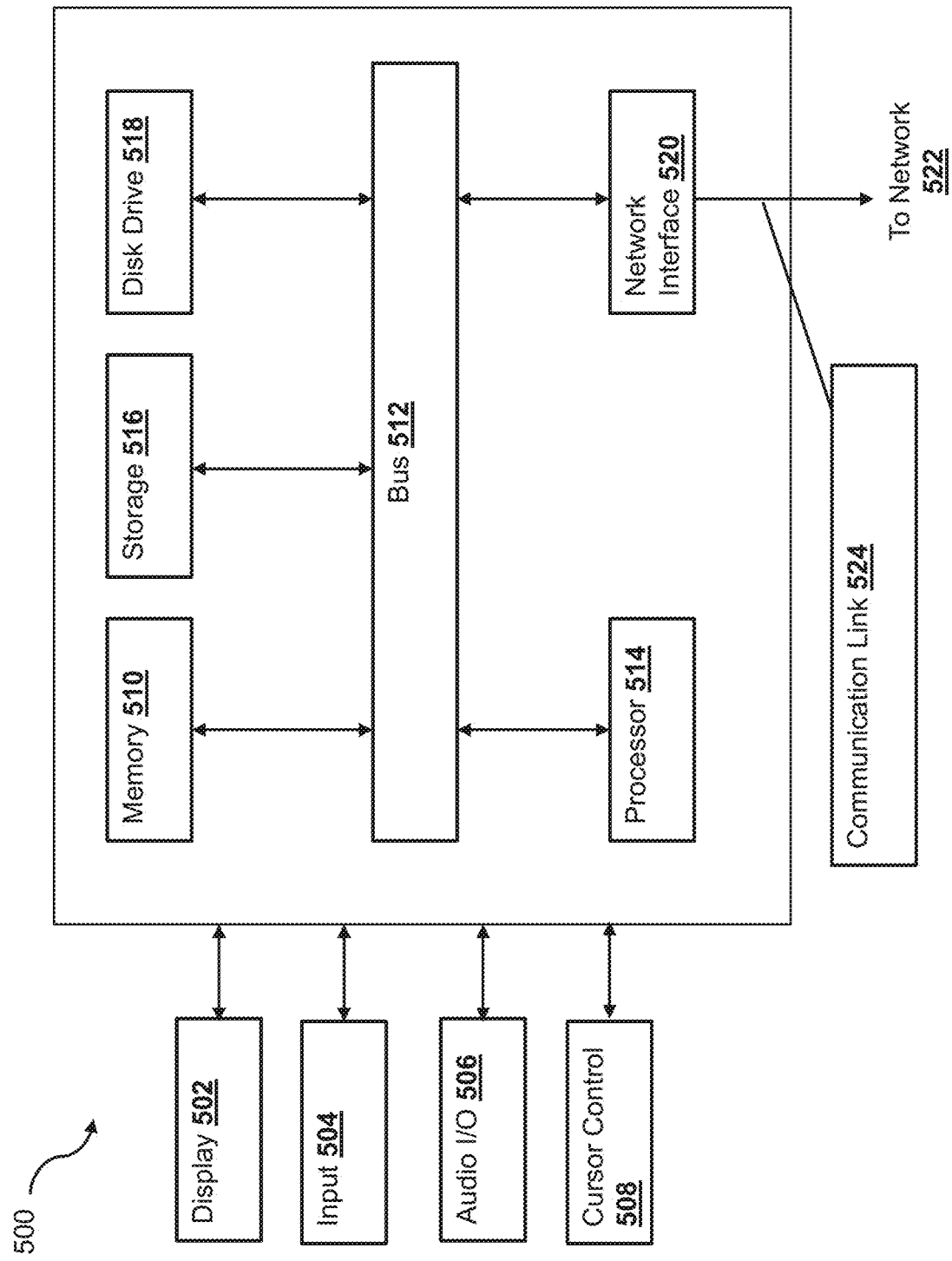
FIG. 5 is a block diagram of a system for implementing a device according to an embodiment of the present disclosure.

FIG. 5 is a block diagram of a computer system 500 suitable for implementing one or more embodiments of the present disclosure, including the service provider server 130, the social media servers 110 and 112, the web server 114, and the user device 120. In various implementations, the user device 120 may include a mobile cellular phone, personal computer (PC), laptop, wearable computing device, etc. adapted for wireless communication, and each of the service provider server 130, the social media servers 110 and 112, and the web server 114 may include a network computing device, such as a server. Thus, it should be appreciated that the devices 110, 112, 114, 120, and 130 may be implemented as computer system 500 in a manner as follows.

Computer system 500 includes a bus 512 or other communication mechanism for communicating information data, signals, and information between various components of computer system 500. Components include an input/output (I/O) component 504 that processes a user (i.e., sender, recipient, service provider) action, such as selecting keys from a keypad/keyboard, selecting one or more buttons or links, etc., and sends a corresponding signal to bus 512. I/O component 504 may also include an output component, such as a display 502 and a cursor control 508 (such as a keyboard, keypad, mouse, etc.). The display 502 may be configured to present a login page for logging into a user account or a checkout page for purchasing an item from a merchant. An optional audio input/output component 506 may also be included to allow a user to use voice for inputting information by converting audio signals. Audio I/O component 506 may allow the user to hear audio. A transceiver or network interface 520 transmits and receives signals between computer system 500 and other devices, such as another user device, a merchant server, or a service provider server via network 522. In one embodiment, the transmission is wireless, although other transmission mediums and methods may also be suitable. A processor 514, which can be a micro-controller, digital signal processor (DSP), or other processing component, processes these various signals, such as for display on computer system 500 or transmission to other devices via a communication link 524. Processor 514 may also control transmission of information, such as cookies or IP addresses, to other devices.

Components of computer system 500 also include a system memory component 510 (e.g., RAM), a static storage component 516 (e.g., ROM), and/or a disk drive 518 (e.g., a solid state drive, a hard drive). Computer system 500 performs specific operations by processor 514 and other components by executing one or more sequences of instructions contained in system memory component 510. For example, processor 514 can perform the phishing detection functionalities described herein according to the process 400.

Logic may be encoded in a computer readable medium, which may refer to any medium that participates in providing instructions to processor 514 for execution. Such a medium may take many forms, including but not limited to, non-volatile media, volatile media, and transmission media. In various implementations, non-volatile media includes optical or magnetic disks, volatile media includes dynamic memory, such as system memory component 510, and transmission media includes coaxial cables, copper wire, and fiber optics, including wires that comprise bus 512. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 524 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system comprising:
a non-transitory memory; and
one or more hardware processors coupled to the non-transitory memory and configured to read instructions from the non-transitory memory to cause the system to perform operations comprising:
determining that an online post submitted to an online social media platform comprises a link;
analyzing the link;
determining that the link corresponds to a phishing campaign based on the analyzing;
in response to the determining that the link corresponds to a phishing campaign, identifying a user account with an online service provider based on the online post, wherein the online service provider is different from the online social media platform; and
modifying a configuration of the user account.

2. The system of claim 1, wherein the link comprises a web address, and wherein the analyzing the link comprises analyzing the web address.

3. The system of claim 2, wherein the analyzing the web address comprises determining whether the web address is intended to imitate a domain name of the online service provider.

4. The system of claim 3, wherein the analyzing the web address further comprises:
dividing the web address into a plurality of portions; and
determining whether any portion in the plurality of portions of the web address matches a segment of the domain name of the online service provider.

5. The system of claim 1, wherein the link comprises a web address and a hyperlink text, and wherein the analyzing the link comprises determining whether the hyperlink text corresponds to the web address.

6. The system of claim 1, wherein the operations further comprise:
determining that a user associated with the identified user account has accessed web content associated with the link, wherein the configuration of the user account is modified based on the determining that the user has accessed the web content associated with the link.

7. The system of claim 1, wherein the operations further comprise:
accessing web content associated with the link;
determining that the web content comprises a web element associated with the online service provider;
detecting that the web element is accessed by a user device associated with the user account; and
in response to the detecting, further modifying the configuration of the user account.

8. A method, comprising:
determining, by one or more hardware processors, that an online feed submitted to an online social media platform comprises a link;
analyzing the link;
determining that the link corresponds to a phishing campaign based on the analyzing;
in response to the determining that the link corresponds to a phishing campaign, identifying, by the one or more hardware processors, a user account with an online service provider based on at least one of a sender or a recipient of the online feed, wherein the online service provider is different from the online social media platform; and
adjusting a security setting of the user account.

9. The method of claim 8, further comprising:
extracting a user handler associated with the sender or the recipient of the online feed;
comparing the user handler against user names of a plurality of user accounts with the online service provider; and
determining that the user handler matches a user name, from the user names, associated with the identified user account.

10. The method of claim 9, further comprising:
analyzing first user activities associated with the identified user account prior to the analyzing the link to derive an activity pattern;
analyzing second user activities associated with the identified account subsequent to the analyzing the link; and
determining that the second user activities deviate from the activity pattern beyond a threshold based on the analyzing the second user activities, wherein the security setting of the user account is adjusted based on the determining that the second user activities deviates from the activity pattern beyond the threshold.

11. The method of claim 8, further comprising:
accessing a website associated with the link;
determining that the website refers to at least one web element external to the website; and
determining that a source address associated with the at least one web element corresponds to a domain of the online service provider, wherein the determining that the link corresponds to a phishing campaign is further based on the determining that the source address associated with the at least one web element corresponds to the domain of the online service provider.

12. The method of claim 11, further comprising:
detecting a user device associated with the user account accessing the at least one web element; wherein the adjusting is based on the detecting.

13. The method of claim 11, further comprising:
detecting a user device accessing the at least one web element; and
storing, on the user device, data indicating that the user device has possibly been targeted by a phishing campaign.

14. The method of claim 13, further comprising:
receiving, from the user device, a request to log in to a particular user account with the online service provider;
determining that the data is stored on the user device; and
in response to the determining that the data is stored on the user device, adjusting a security setting associated with the particular user account.

15. A non-transitory machine-readable medium having stored thereon machine-readable instructions executable to cause a machine to perform operations comprising:
determining that an online post submitted to an online social media platform comprises a link;
analyzing the link;
determining that the link corresponds to malicious content based on the analyzing;
in response to the determining that the link corresponds to malicious content, identifying a user account with an online service provider based on the online post, wherein the online service provider is not associated with the online social media platform; and
adjusting a security setting of the user account.

16. The non-transitory machine-readable medium of claim 15, wherein the link comprises a web address, and wherein the analyzing the link comprises analyzing the web address.

17. The non-transitory machine-readable medium of claim 16, wherein the analyzing the web address comprises:
dividing the web address into a plurality of portions; and
determining whether any portion in the plurality of portions of the web address match a segment of a domain name associated with the online service provider.

18. The non-transitory machine-readable medium of claim 15, wherein the link comprises a web address and a hyperlink text, and wherein the analyzing the link comprises determining whether the hyperlink text corresponds to the web address.

19. The non-transitory machine-readable medium of claim 15, wherein the operations further comprise:
determining that a user associated with the user account has accessed web content associated with the link, wherein the security setting of the user account is adjusted based on the determining that the user has accessed the web content associated with the link.

20. The non-transitory machine-readable medium of claim 15, wherein the operations further comprise:
accessing web content associated with the link;
determining that the web content comprises a web element associated with the online service provider;
detecting that the web element is accessed by a user device associated with the user account; and
in response to the detecting, further adjusting the security setting of the identified user account.

* * * * *